United States Patent [19]
Chang et al.

[11] Patent Number: 5,394,237
[45] Date of Patent: Feb. 28, 1995

[54] PORTABLE MULTIBAND IMAGING SPECTROMETER

[75] Inventors: Sheng-Huei Chang, Millbrook; Mark J. Westfield, Hopewell Junction; Dennis P. Witz, New Paltz, all of N.Y.

[73] Assignee: Geophysical & Enviromental Research Corp., Millbrook, N.Y.

[21] Appl. No.: 974,152

[22] Filed: Nov. 10, 1992

[51] Int. Cl.[6] .............................................. G01J 3/36
[52] U.S. Cl. ................... 356/328; 250/339.02; 250/339.05; 356/51
[58] Field of Search ............... 356/319, 323, 325, 326, 356/328, 51; 364/498, 526; 250/339, 372, 339.02, 339.05, 339.07

[56] References Cited

U.S. PATENT DOCUMENTS

| | | | |
|---|---|---|---|
| 3,923,399 | 12/1975 | Brumley | 356/96 |
| 4,043,668 | 8/1977 | Goetz et al. | 356/73 |
| 4,345,840 | 8/1982 | Goetz et al. | 356/407 |
| 4,560,275 | 12/1985 | Goetz | 356/326 |
| 4,814,870 | 3/1989 | Crall | 358/113 |
| 4,961,646 | 10/1990 | Schrammli et al. | 356/328 |
| 5,075,875 | 12/1991 | Love et al. | 395/117 |
| 5,149,959 | 9/1992 | Collins et al. | 250/226 |
| 5,218,458 | 6/1993 | Kochis et al. | 358/448 |
| 5,267,178 | 11/1993 | Berner | 364/498 |
| 5,276,321 | 1/1994 | Chang et al. | 250/226 |

OTHER PUBLICATIONS

SpectraFax 440 Portable Field Spectroradiometer, Daedalus Enterprises, Inc. (undated catalog).
AA440 Portable Field Spectroradiometer, Daedalus International Newsletter, p. 2, Vo. 7, No. 2, Aug. 1986.
Telefax from Giancarlo Maracci, Joint Research Center, to M. J. Westfield, GER Corp., Oct. 19, 1992.
GER Introduces the mini IRIS-512 (GER Corp, undated).
Introducing the New mini IRIS RT (GER Corp., undated).
New Mini IRIS RT Hand Held Spectroradiometer (GER Corp, undated).
Updated Specifications for IRIS-M Spectrometer (GER Corp, undated, Faxed Jul. 23, 1992).

Primary Examiner—F. L. Evans
Attorney, Agent, or Firm—Arnold L. Albin

[57] ABSTRACT

A light-weight, portable spectroradiometer provides a real-time data acquisition capability from 0.3 μm to 3.0 μm with selectable integration periods, and operates through a Centronics parallel port of a personal computer to program the spectrometer, store data, and to provide real time graphic output. Equipped with two spectrometers operating from a common optical input, high detector efficiency is obtained by structuring the detector elements for maximum energy gathering capability, matched to slit aperture size and orientation. No filters or mechanically driven mirrors are required, thereby permitting a compact, easily portable instrument. If desired, the detector array is readily adaptable to thermoelectric cooling.

11 Claims, 11 Drawing Sheets

| PRINTER FUNCTION | PIN | MINI IRIS FUNCTION |
|---|---|---|
| | | OUTPUT PORT 37A |
| −SELECT INPUT | 17 | BIT 3 |
| −INITIALIZE PRINTER | 16 | BIT 2 |
| −AUTO FEED | 14 | BIT 1 |
| −STROBE | 1 | BIT 0 |
| | | INPUT PORT 379 |
| +BUSY | 11 | BIT 3 |
| −ACKNOWLEDGE | 10 | BIT 2 |
| +P.END (PAPER OUT) | 12 | BIT 1 |
| +SELECT | 13 | BIT 0 |

PRIOR ART

PORTABLE MULTIBAND IMAGING SPECTROMETER

BACKGROUND OF THE INVENTION

1. Field of the Invention

The invention relates generally to spectrometers, and more particularly to a portable apparatus for narrow-band radiometry and for real time detection, recording, and display of scientific spectra in the form of radiated and reflected emissions for investigations over the ultraviolet through infrared wavelengths.

2. Description of the Prior Art

High resolution imaging spectrometers are well known to the art. One such spectrometer is disclosed in U.S. Pat. No. 5,149,959, Airborne Multiband Imaging Spectrometer, filed Apr. 15, 1991 and issued to the assignee of the present invention. A spectrometer of this type has proven of great commercial success in surveying for oil spills, mineral deposits, geological formations, vegetation studies, pollution studies, solar spectra, and the like. However, its size and weight make it impractical for field observations, where a lightweight, portable instrument is required.

Further, instruments of this type require complex electro-mechanical systems for control of a scanning mirror and may require the using of Dewars or other cooling techniques to achieve low detector noise levels.

Such portable instruments as have been developed weight up to forty pounds, and may require a backpack for battery and computer support, which mitigates against utility in the field. Where a portable computer has been integrated into the unit, it has required additional interface circuitry to process spectrometric data and control the detector head, adding weight, space, and cost to the system.

The present invention in one embodiment provides a light-weight portable instrument, operative over the 0.3–3.0 μm range, capable of providing raw digital data or operating in radiance, reflectance, irradiance and averaging modes. It features direct coupling to the parallel port of a personal computer for control and readout, hence allowing the use of notebook or laptop type computers for real-time data acquisition and display. Resolutions from 8 to 24 nm over 140 channels are attainable in a compact, lightweight package.

SUMMARY OF THE INVENTION

A light-weight, portable spectroradiometer provides a real-time data acquisition capability from 0.3 μm to 3.0 μm with selectable integration periods, and operates through a of a personal computer spectrometer and provide real time graphic output. Equipped with two spectrometer operating from a common optical input, high detector efficiency is obtained by structuring the detector elements for maximum energy gathering capability, matched to a slit aperture size and orientation. No filters or mechanically driven mirrors are required, thereby permitting a compact, easily portable instrument. If desired, the detector array is readily adaptable to thermoelectric cooling.

DESCRIPTION OF THE PREFERRED EMBODIMENTS

Figure 1:
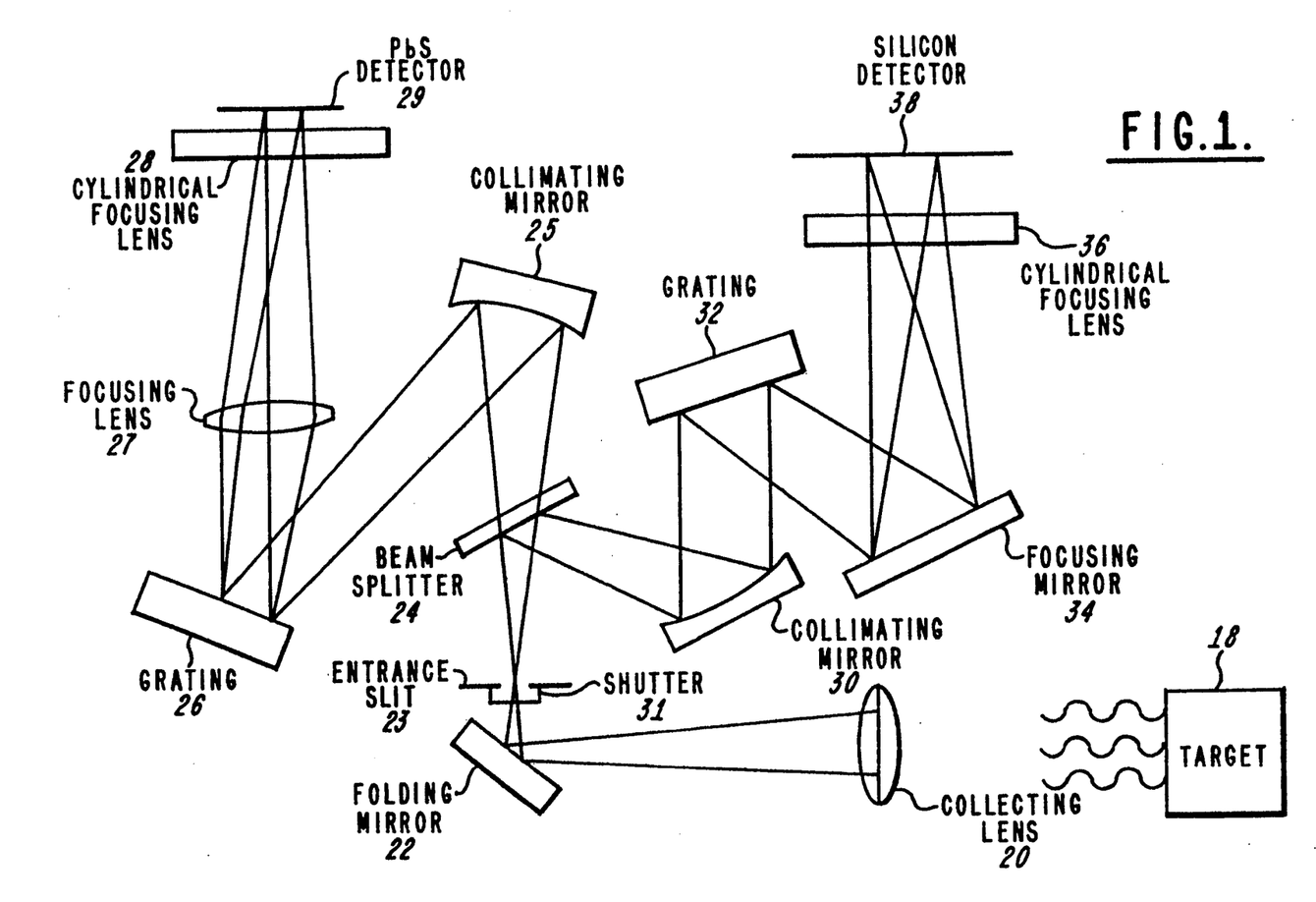
FIG. 1 is a schematic diagram illustrating a cross-sectional planar view of an exemplary spectrometer in accordance with the present invention.

Referring now to FIG. 1 of the drawings, wherein like reference numbers denote similar or identical components, a schematic drawing of a dual spectroradiometer employing the principles of the invention is disclosed. A collecting lens 20 receives incident emissions from a target 18 whereupon it is reflected from a folding mirror 22, and focused upon an entrance slit aperture 23 through a shutter 31. The focused optical image is incident upon a beam splitter 24, which is preferably comprised of a blazed grating to apportion the beam into first and second spectrometers for sensing corresponding spectral regions, herein a range from ultraviolet to visible to near infrared of 0.3–1.0 μm for a silicon detector array and a short wave infrared range of 1.0–3.0 μm for a lead sulphide detector array. Other optical devices adapted for providing first and second ranges of spectral emissions having different wavelengths, such as dichroic mirrors, prisms, or filters, are also suitable. The first spectrometer is responsive to the short wave infrared range and is comprised of a parabolic collimating mirror 25 which is angularly disposed to reflect its portion of the split beam upon a diffraction grating 26, which is constructed with a suitable blaze angle and disposed at an angle of incidence suitable for spreading the incident spectral emissions over a predetermined angular dispersion compatible with detector array 29. The emissions reflected from grating 26 are focused by a lens 27 through cylindrical focusing lens 28 upon PbS detector array 29. The detector array 29 is comprised of a plurality of parallel, spaced rectangular photoresponsive elements, wherein the spacing is adapted to conform to the dispersion of the spectral components and the desired resolution of the display. The array is oriented with the longitudinal axis of the elements parallel to the longitudinal axis of the slit for maximum energy gathering power. Since the slit aperture tends to diffract the focused beam across its narrow dimension, the tendency to spread the emissions across the narrow dimension of the detector is corrected by orienting the longitudinal axis of the cylindrical lens parallel to the longitudinal axis of the rectangular detector element.

The second spectrometer is responsive to the ultraviolet through near infrared range and comprises a parabolic collimating mirror 30, upon which is directed a second portion of the incident emissions from beam splitter 24. In a like manner as described with respect to the first spectrometer, the emissions in the second spectrometer traverse a grating 32, focusing mirror 34, cylindrical focusing lens 36, and are incident upon a second detector array 38, comprised of a plurality of rectangular Si detectors disposed with their longitudinal axes in parallel and parallel to the longitudinal axis of cylindrical focusing lens 36.

A resolution of 10 nm from 0.3 μm to 1.0 μm is obtained with the structure set forth herein. The resolution is selectable at 24 nm from 1.0–3.0 μm or 8 nm from 2.0–3.0 μm by changing one grating.

Figure 2A:
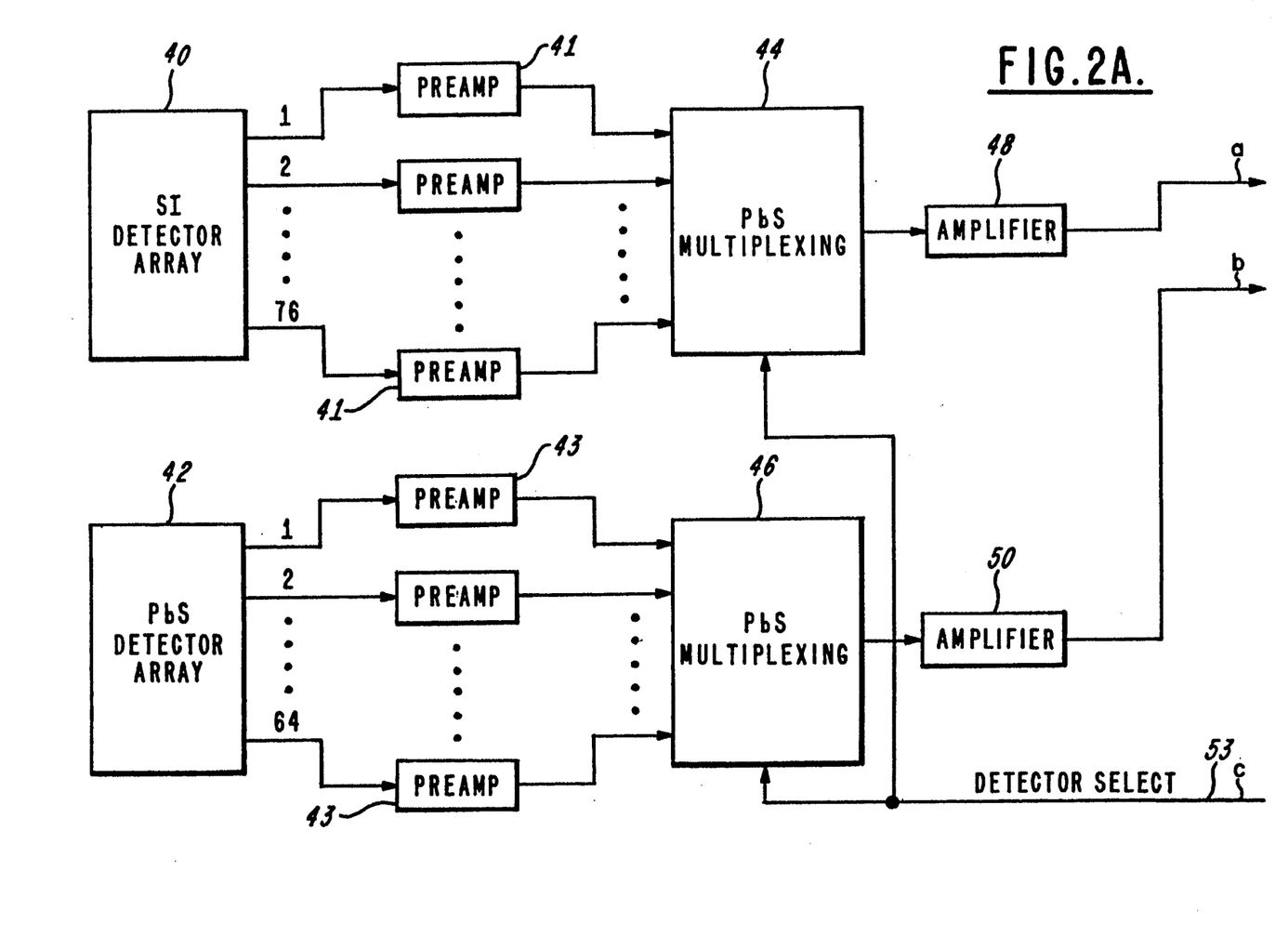
FIGS. 2A and 2B are schematic block diagrams illustrating the signal processing of a preferred embodiment of the present invention.
Figure 2B:
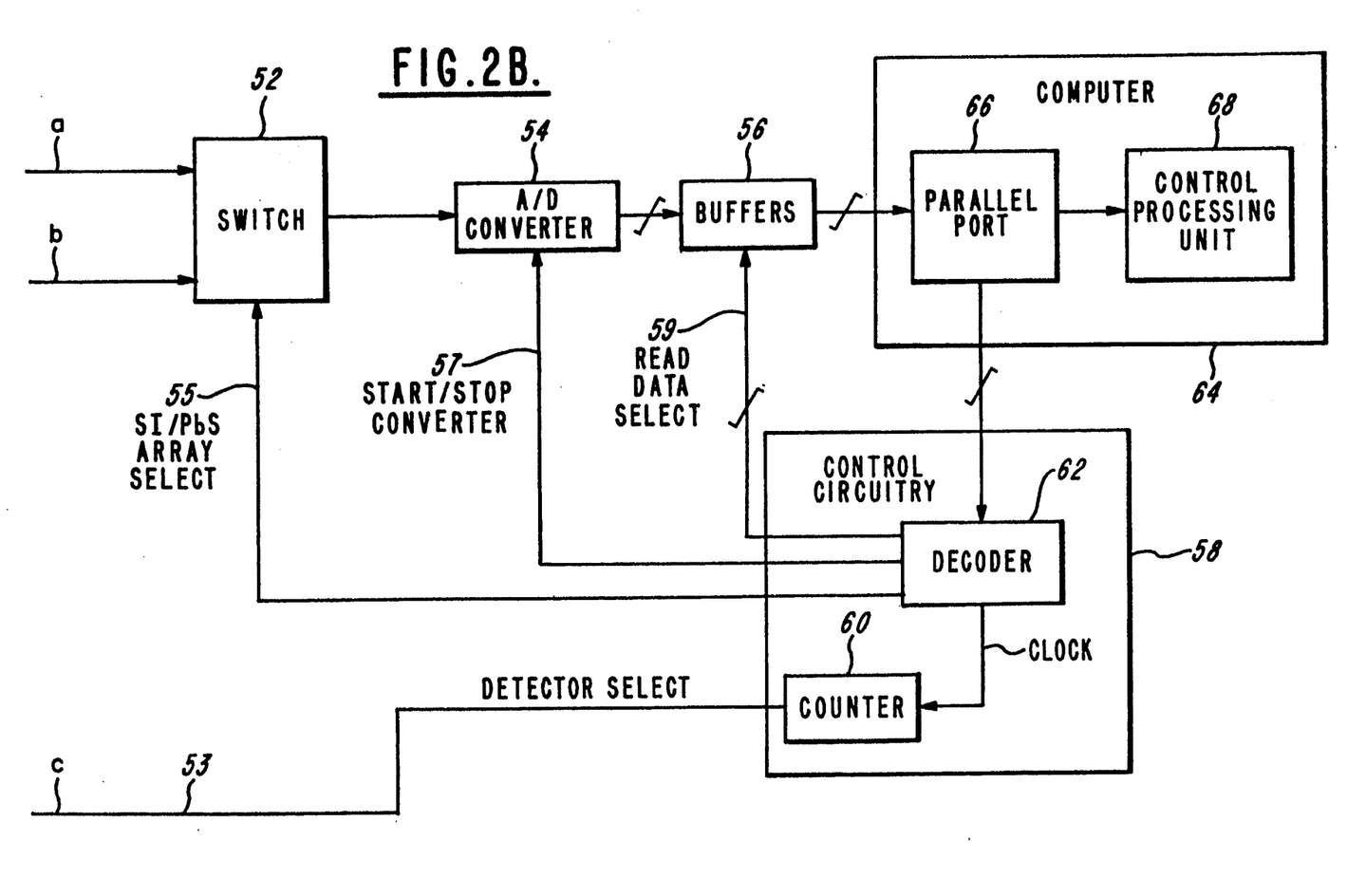

FIG. 2 is an electrical block diagram of a preferred embodiment of the invention. It is comprised of two circuits corresponding to the dual spectrometers disclosed above, one circuit responding to a 76 element Si detector array and a second circuit responding to a 64 element PbS array 42. It is to be noted that the number of elements in each array, and the number of arrays, is exemplary and not to be considered limiting. A suitable multi-element linear silicon array is available as type ADC8019 as manufactured by Advanced Optoelectronics, City of Industry, Calif. A suitable multi-element lead sulphide linear array is available from Optical Filter Division, Natick, Mass.

Each sensing element of detector array 40 is coupled individually to a preamplifier 41 and applied to a conventional multiplexer 44. Multiplexer 44 sequentially samples the signal level from each detector in the array and applies a corresponding analog signal to amplifier 48, the readout time of each element being correlated with a predetermined spectral frequency. In a like manner, each sensing element of detector array 42 is coupled to a preamplifier 43 and applies the output signals to multiplexer 46 for sequential sampling.

Control circuitry 58 comprises a decoder 62 coupled to receive signals from parallel port 66 of computer 64, in a manner to be described. Decoder 62 generates a clock signal which is applied to advance and reset counter 60, whose output alternately and sequentially activates multiplexers 44 and 46 through a control signal applied to detector select lead 53.

The outputs of multiplexers 44 and 46 are applied to conventional amplifiers 48 and 50, respectively, and then to a switch 52. Switch 52 acts in response to an array select signal 55 derived from decoder 62 and computer 64 to alternately and sequentially apply a selected one of the outputs of amplifiers 48 and 50 to analog/digital converter 54. Converter 54 is controlled by start/stop signal 57 from decoder 62 and computer 64 in a manner as to allow a complete scan of each detector array in turn, and to apply a digital signal corresponding to the analog input signal to buffer 56 as a 16-bit signal. Read data select line 59, also energized by decoder 62 and computer 64, applies sequential 4-bit bytes to parallel port 66 in synchronism with the A/D converter.

According to an important aspect of the invention, the spectrometer may be utilized in conjunction with any personal type computer, such as a laptop or notebook computer, by interfacing with the industry standard Centronics parallel port interface to provide instructions and to transfer data to computer storage for display or to memory for later display or processing. No additional interface cards or modem is required, rendering it an efficient and economical approach to portability in the field. While the Centronics interface was intended only for transferring data from a computer to an associated device such as a printer over an 8-bit parallel data bus, there are provided a group of control and status lines which transmit the printer operational conditions, such as handshaking data, paper out, etc., back to the computer. These lines allow the computer to control operation of the printer, while allowing the printer to return status information to the computer. The present invention accesses these control and status lines in a novel manner, so that the spectrometer can be interfaced with the computer without any auxiliary circuitry installed therein. Particularly where laptop computers were used in the prior art for their compact size and reduced weight, they were not readily adaptable to the installation of such auxiliary circuitry, and the increased power consumption shortens battery life.

Figure 3:
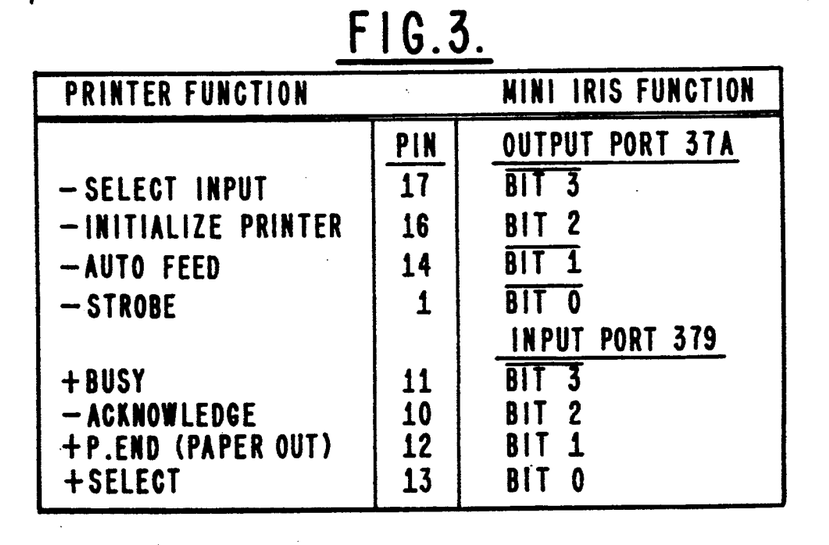
FIG. 3 is a table showing the parallel port functional connections between spectrometer and computer.

FIG. 3 is a table showing the parallel port functional connections between spectrometer and computer. Under the label "Printer Function" is shown the functional notation for corresponding pin numbers of a Centronics parallel port. Not shown are the eight data lines, pins 2–9, which have no application in the present invention. Under "Mini-Iris Function" is shown the correlation to the input and output data lines of the spectrometer.

In the prior art with a personal computer when a byte of data is transmitted from the computer to a parallel interface I/O (input/output) port, eight lines transmit an entire 8-bit byte. The external device attached to the computer can then read the data, byte-by-byte, or store it in memory. However, the data lines in present personal computers are generally unidirectional, and adapted for transmitting data to the connected device, and only discretes are returned to the computer to indicate the status of the device, or to validate the transmitted data.

The central processing unit (CPU) 68 of the computer controls the parallel port printer data register, which sends data to the printer, a printer status register which reads printer status, and a printer control register which sets the printer control line. The port status register, however, allows the CPU to read the port status lines (select, busy, paper end, error, and acknowledge). As applied in the present invention, this allows data to be read in a 4-bit nibble at a time, whereupon a 16-bit word may be reconstituted from four 4-bit bytes sequentially applied.

Thus, if four lines from the computer parallel port are connected to four lines defining the input port of the spectrometer, the computer can send a 4-bit data byte out of its printer port. The spectrometer will read that data on the status lines. To send data back to the computer, a similar connection is made from the spectrometer output port over the additional available four lines to the computer status register.

Figure 4:
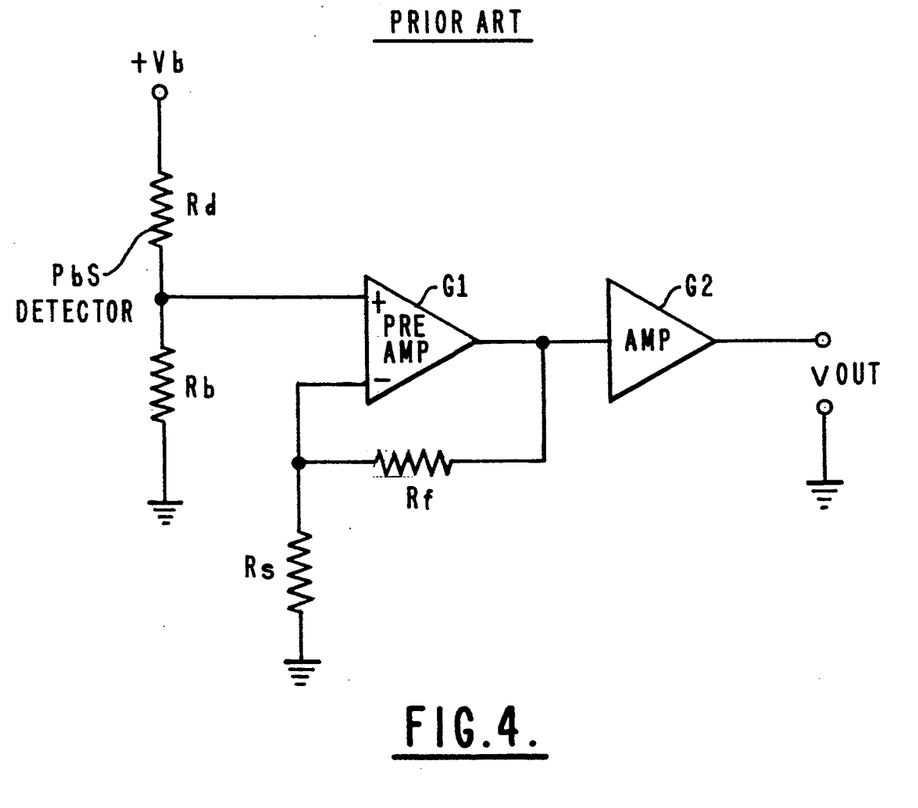
FIG. 4 shows a diagram of a prior art PbS detection and amplification circuit.

FIG. 4 shows a circuit of a prior art infrared sensor in which the detector Rd is comprised of a photoresponsive element, such as PbS, coupled to a preamplifier G1 and an output amplifier G2. In this photoresponsive detector, exposure to incident infrared radiation results in a change in the electrical conductivity of the sensing element. If the conductivity of the detector increases because of absorbed infrared photons, the resistance Rd of the detector decreases. The detector is biased from a voltage source Vb and connected in series with a resistor Rb, thus forming a voltage divider. The change in conductivity develops a voltage change across resistor Rb which produces a signal which is coupled to the input of preamplifier G1. However, since the resistance of detector Rd is in the megohms, and current must be limited to avoid heating the detector, the signal is minute and preamplifier G1 must be followed by a subsequent amplifier stage G2 to boost the signal to a usable level.

Figure 5:
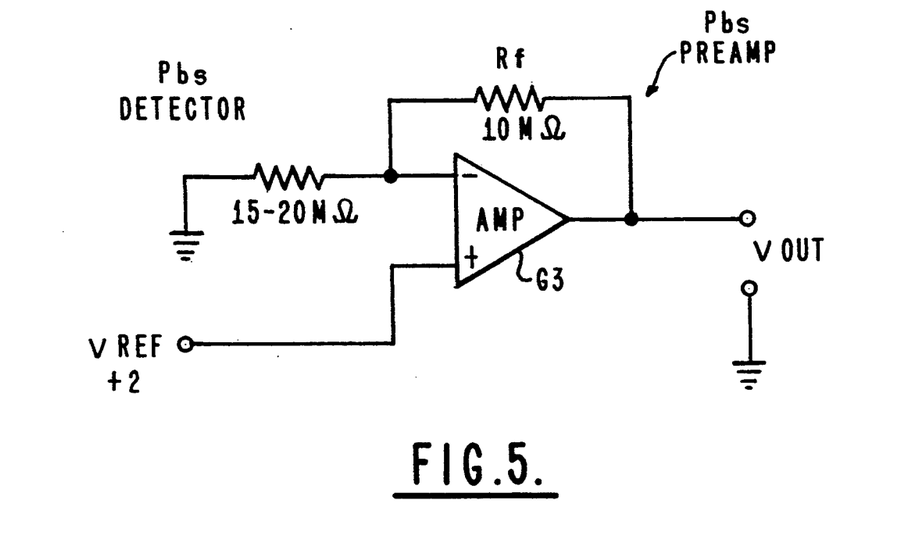
FIG. 5 is a circuit diagram of an improved PbS detector and amplifier utilized in the present invention.

In the present invention, as shown in FIG. 5, the detector is coupled in voltage divider fashion across input (−) and output terminals of an operational amplifier G3. A reference voltage Vref is applied to a second input (+). A change in conductivity of the detector element results in a change in gain of amplifier G3 by increasing or decreasing the inverse feedback voltage, and is sufficient to produce an adequate output voltage without a further amplifier stage. Advantageously, this improved arrangement requires no DC bias, thus minimizing heat dissipation, and results in a simpler more economical circuit, using fewer components than the prior art, thereby permitting more compact construction, lending to portability. Since each detector element in an array, which may number 64 or more in the preferred embodiment, requires an individual amplifier, a substantial saving in cost, space and weight, as well as improved reliability from the lower parts count, is realized.

Figure 6:
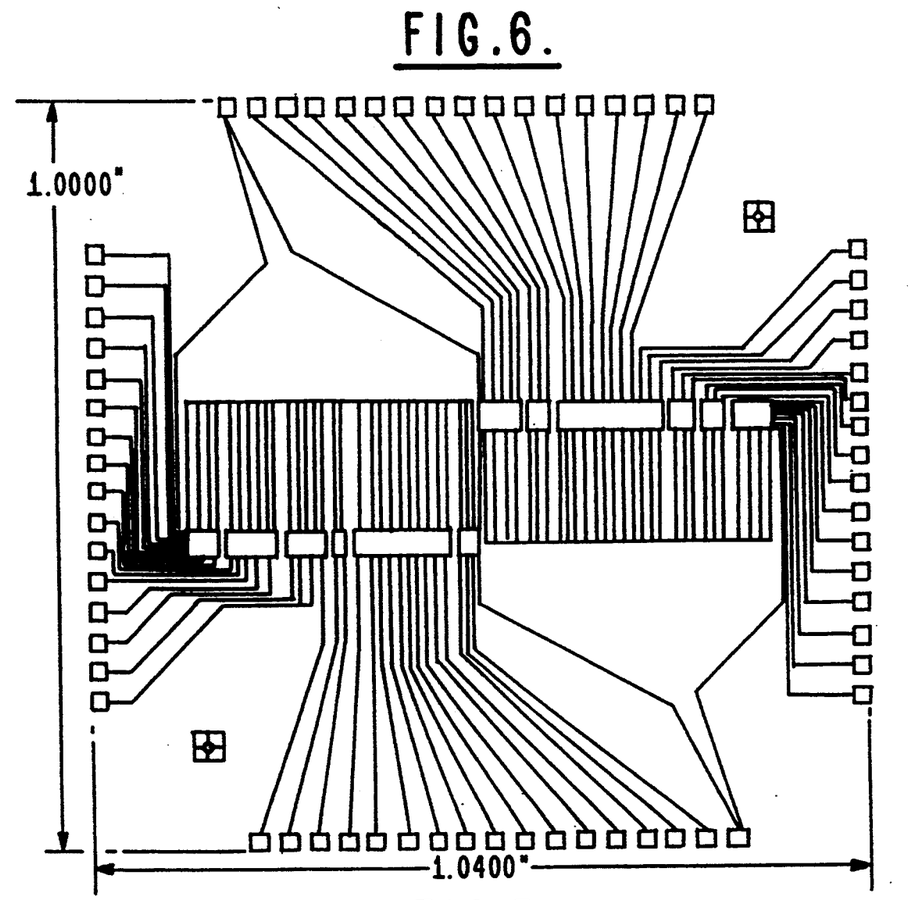
FIG. 6 is a pictorial representation of a Pbs detector array as utilized in the present invention.

Referring now to FIG. 6, a detail drawing of a PbS array suitable for the present invention is disclosed. As opposed to prior art arrays, which relied on geometrically square sensing elements where the aperture dimension is the same as the center-to-center spacing, the present invention utilizes a rectangular photoresponsive element to more efficiently utilize the available energy transmitted by the rectangular slit aperture. Each element has a length and relative spacing coordinated with the spectral distribution to be achieved by the optical system. The rectangular element allows collection of more of the impinging emissions and heightens the efficiency of detection.

Figure 7:
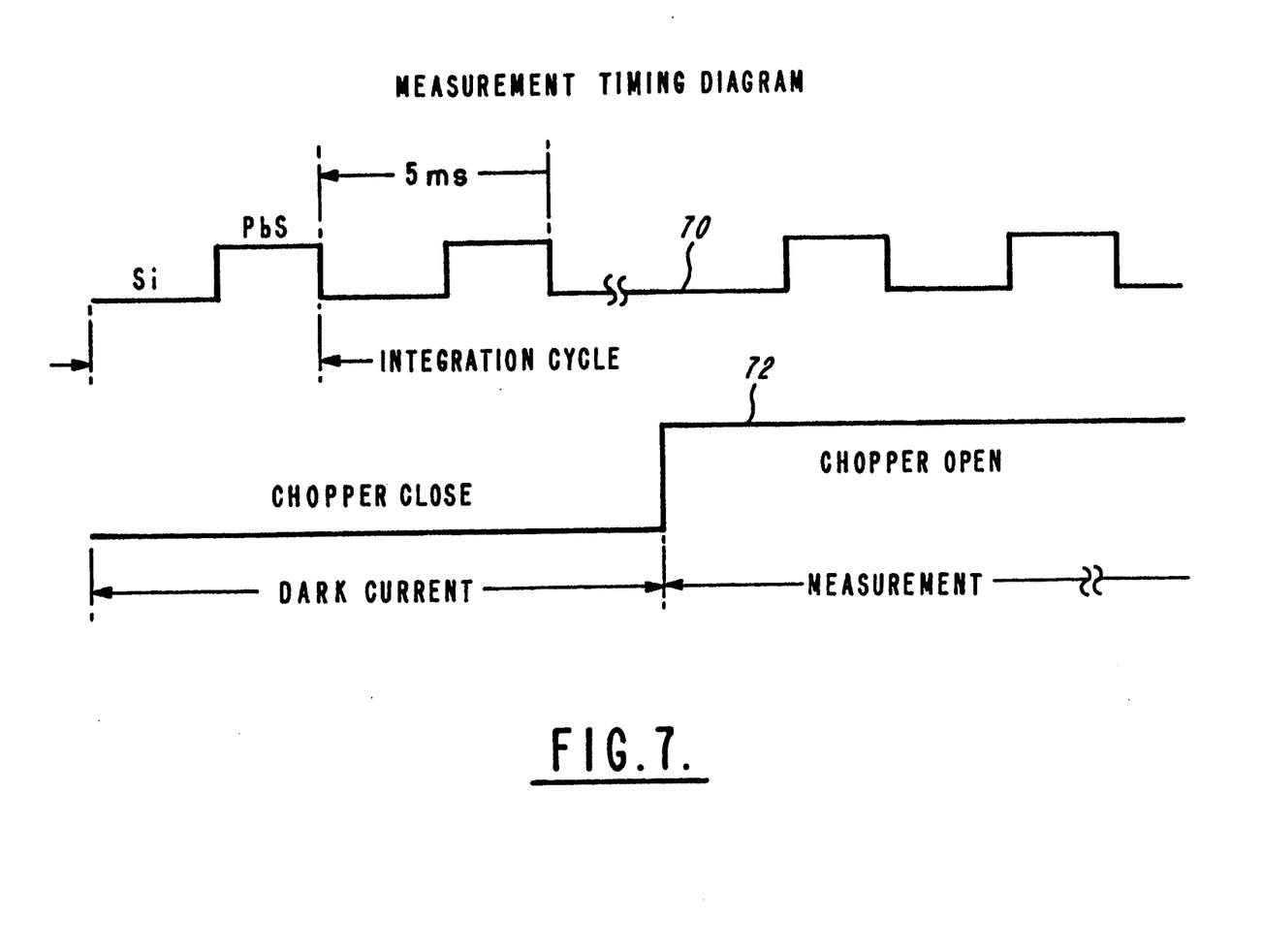
FIGS. 7 and 8 are timing diagrams useful in understanding the operation of the invention.
Figure 8:
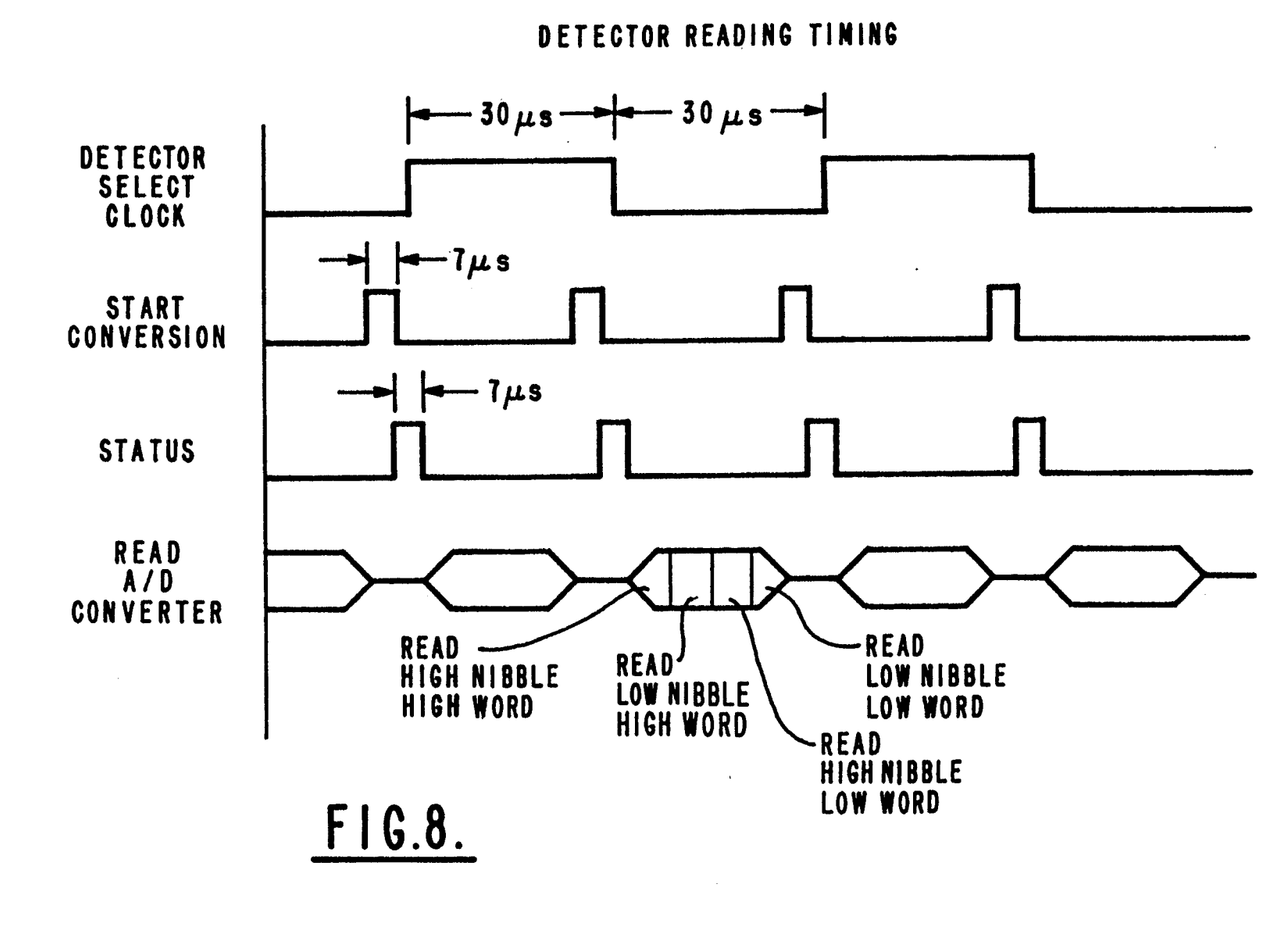
Figure 9:
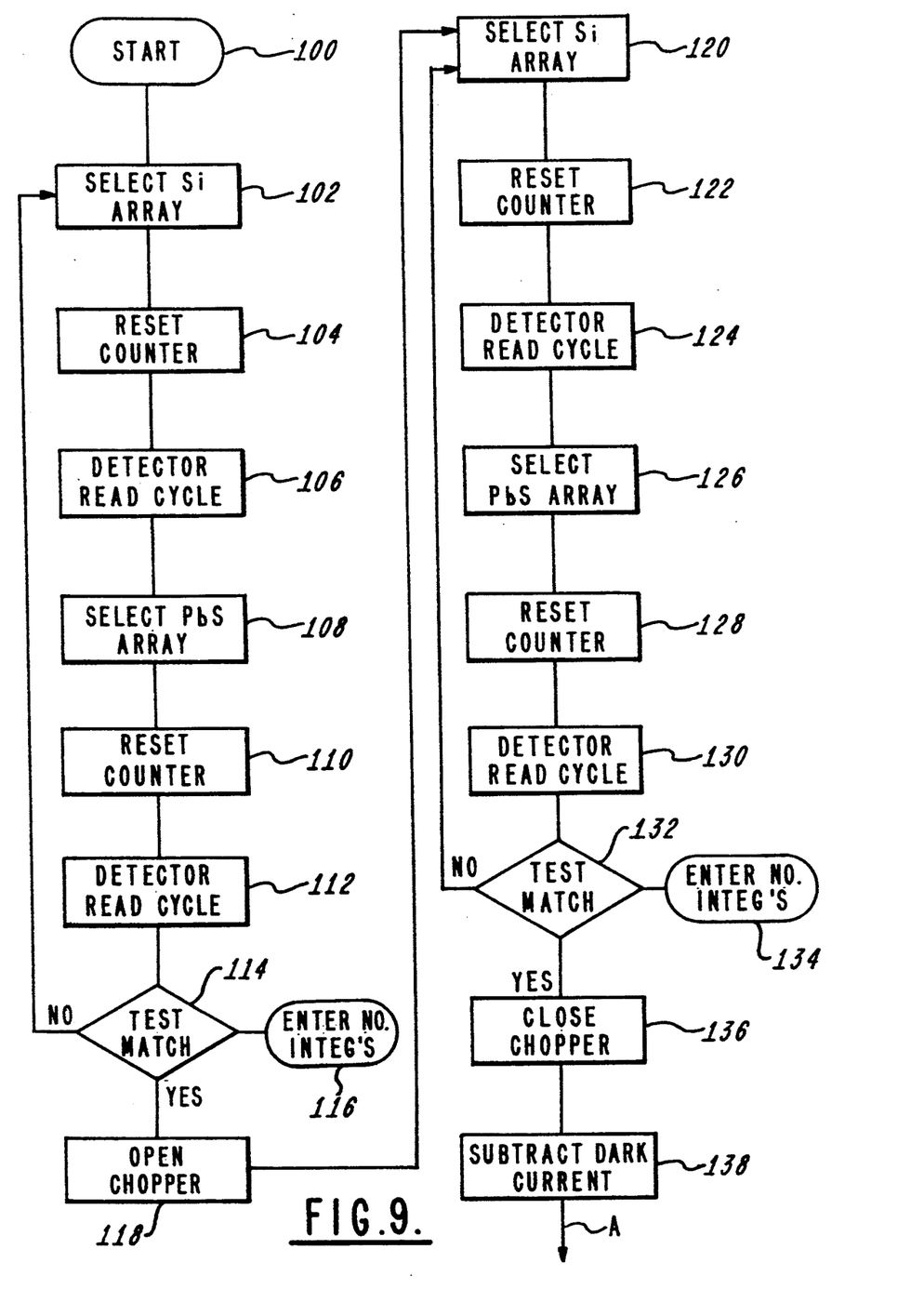
FIGS. 9 and 10 are flow charts showing the sequence of measurement and data readout, useful in understanding the operation of the invention.
Figure 10:
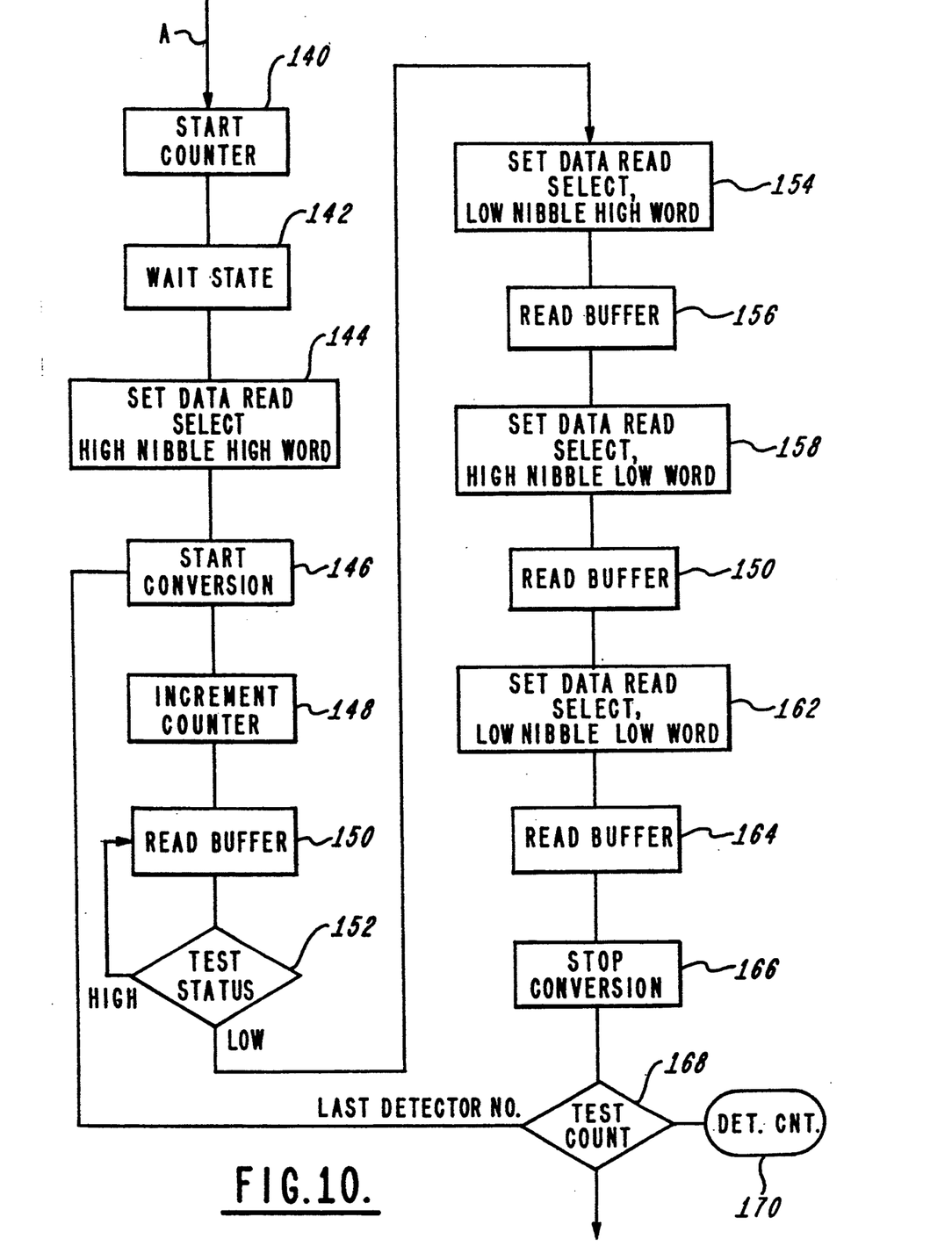
Figure 11:
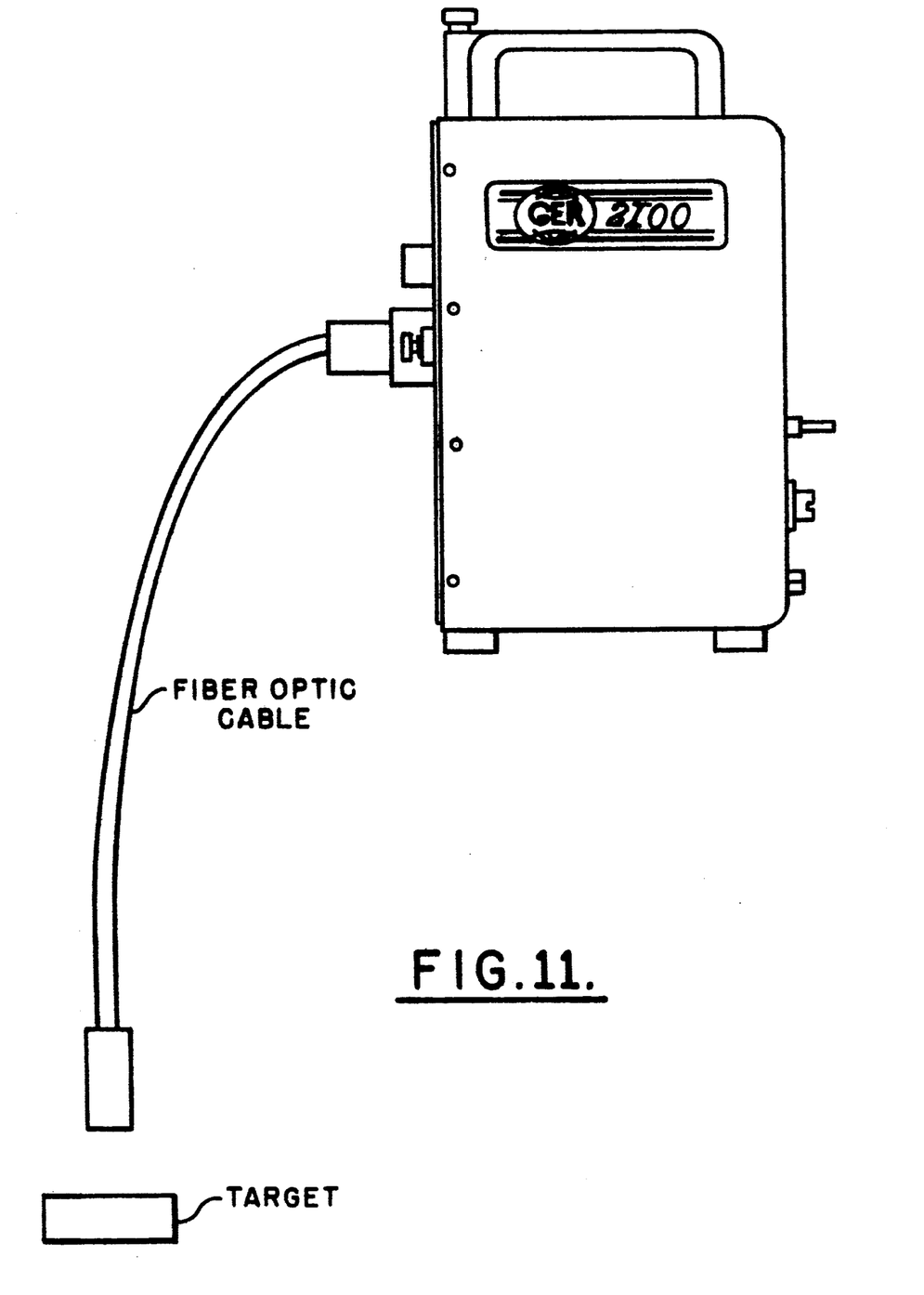
FIG. 11 shows a fiber optic collecting probe feeding the input optics.
Figure 12:
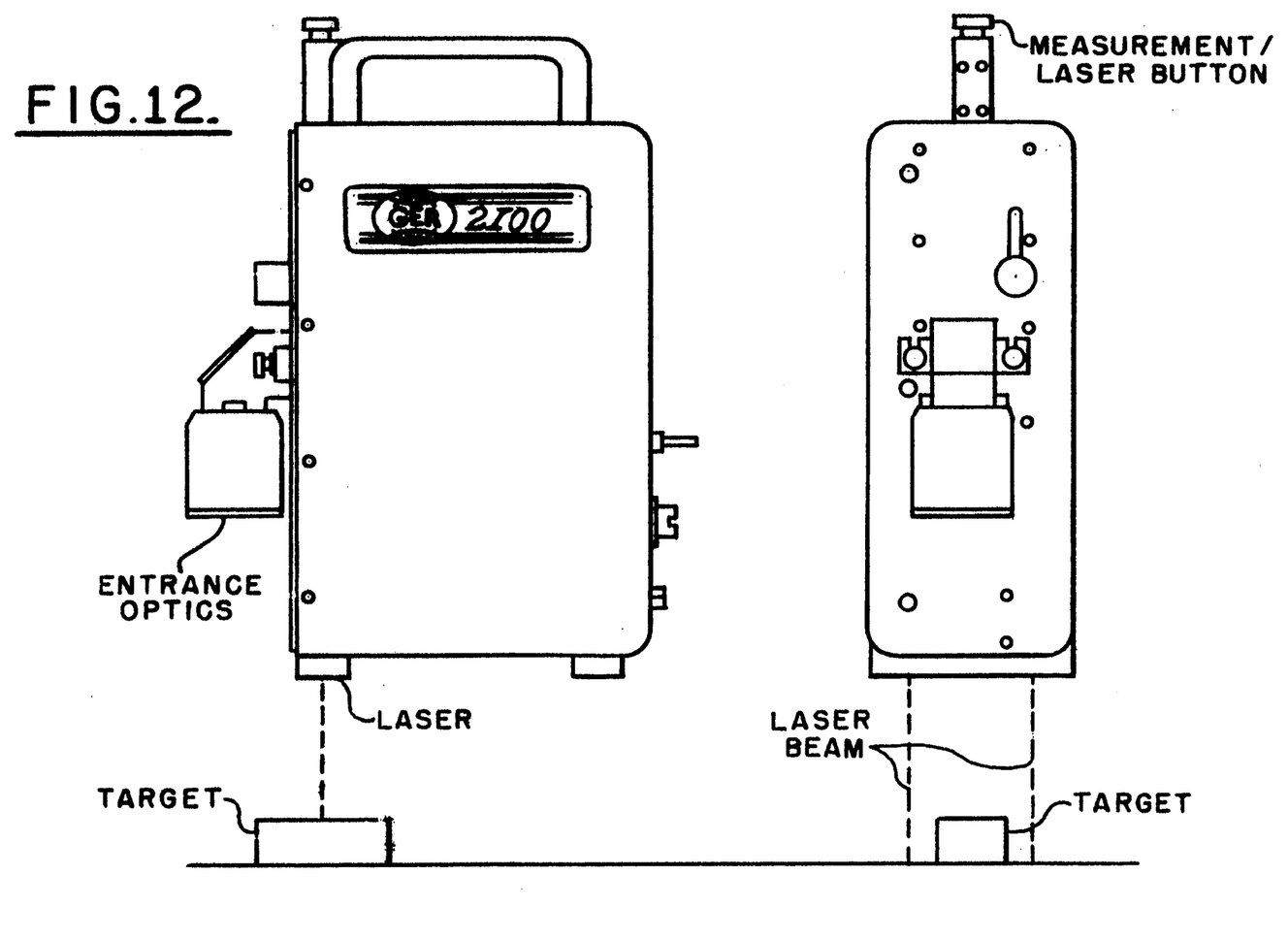
FIG. 12 shows a dual beam laser target finder.

FIGS. 7 and 8 are timing diagrams useful in understanding the invention in cooperation with the block diagram of FIG. 2 and flow charts FIGS. 9 and 10, to be described.

Referring now to FIG. 7, it may be desirable when the intensity of the emissions under study is low to perform an integration of successive readings of the array detectors, thereby improving signal recovery, or when it is advisable to manually scan the subject over a period of time, to obtain an average intensity reading. The invention allows for a variable integration cycle, as programmed by computer 64 and shown in waveform 70. This integration cycle may vary from a few milliseconds to hours. Further, in order to reduce the influence of the dark current on the processed sensor outputs, the dark current will be subtracted from the total output, thereby approximating the true signal level due to emissions. A shutter 31, co-located with entrance slit aperture 23 and designated as a "chopper" in waveform 72 of FIG. 7, is caused to open and close by control circuitry 58 in accordance with a programmed number of read cycles, which may be determined by the operator, and established by counter 60. Since a shutter type mechanism is used, it may be programmed to trace substantially square wave, sinusoidal, or other characteristic opening and closing waveforms.

Timing diagram FIG. 8 shows the structure and operation of the data read cycle. Detector select line 53 is clocked at a rate of 30 μs between read cycles. A start conversion pulse of about 7 μs is generated on start/stop lead 57 to initiate the A/D conversion cycle. A 16-bit byte comprised of two 8-bit words is stored in buffer 56 during conversion, and followed by a stop pulse, also of 7 μs duration, indicated by the status waveform. Read select lead 58 is then operative to read out the stored data in 4-bit bytes. Thus, the high nibble, high word of 4 bits is followed by the low nibble, high word; high nibble, low word; and low nibble, low word, and read into parallel port 66 as heretofore described.

Further understanding of the invention may be gained from examination of flow charts FIG. 9 and FIG. 10. Start command 100 initiates selection of the silicon detector array at block 102 with the chopper closed for a dark current baseline measurement. Counter 60 is reset to synchronize the timing pulses at block 104 to initiate the detector read cycle, block 106. After completion of the silicon array scan, the lead sulphide array is selected at block 108, counter 60 is reset at block 110, and the detector read cycle 112 is completed. If an integration cycle has been commanded at block 116, the count is checked at block 114 for a match with the commanded integration time. If the required number of road cycles have not been completed, block 102 is again selected, and the cycle repeats until the count is verified. At block 118 the chopper is opened to initiate another read sequence. Blocks 120 through 134 operate in a similar manner as described with respect to blocks 102 through 118. At block 130 the chopper is again closed and the read cycle is repeated while the accrued emission data is processed.

The dark current values are subtracted from the light current values at block 138, and the counter started at block 140 in accordance with the timing diagram of FIG. 8. After wait state 142 the data read select line 58 reads the high nibble, high word. A/D conversion is started at block 146 and counter 60 incremented at block 148. Buffer 56 is read at block 150 and the status line tested at block 152. If the status line is high, indicating reading of the buffer is incomplete, the read cycle is maintained. Upon completion of reading out the word stored in buffer 56, the status line returns to a low condition, causing data select read line 58 to access the low nibble, high word in block 154 and read the buffer at block 156. In similar fashion, blocks 158 through 164 result in reading the remaining 4-bit mibbles. At block 166 the A/D conversion phase is completed, and a test made to assure that all four nibbles have been counted. The read cycle is then complete.

When a portable spectrometer is utilized in the field, the narrow field of view diotates that the optics must be accurately directed at a point to be measured. Prior art devices have utilized a beam of light, such as from an incandescent lamp, to illuminate the point of interest. However, due to spreading of the light beam and the lack of sufficient intensity to accurately define the target in bright sunlight, it is of limited usefulness. One embodiment of the present invention uses a pair of closely spaced laser beams of substantially equal intensity, spaced of the order of one inch on centers, which may be generated from a single laser element, to illuminate the target, their parallel nature clearly defining the point of measurement as midway between the beams more accurately than attempting to find the center of a single beam, and providing a highly visible, high intensity light source with minimum weight and power consumption. Providing a single beam requires complex optics to align the finder beam with the optical center of the spectrometer without directing the beam through the acquisition optics, which otherwise could result in undesirable dispersion of the laser beams. A helium-neon laser operating at 633 nm or a laser diode at 670 nm would provide adequate intensity. The system is structured to initiate the laser beam when a trigger of the spectrometer is pulled, and to turn off the laser beam and initiate data acquisition on a second pull of the trigger.

A further embodiment utilizes a fiber optic cable coupled to the spectrometer head. A single fiber is adequate for sensing with the basic spectrometer system, and provides flexibility in precisely measuring designated target areas. The limited aperture can replace the entrance slit and effectively provides a point source pickup. By using a multiple fiber cable, the aforementioned optional parallel laser beam finder can also be routed through the cable.

While the embodiment described is generally intended to be accompanied by a personal computer for data acquisition, it is clear that the buffer outputs could be directed to a form of storage, such as a random access memory with minimal additional circuitry.

An improved embodiment of the present invention provides 512 channels with a resolution of 1.5 nm over a range of 0.3 $\mu$m to 1.0 $\mu$m and an on-board storage capacity of at least 256 spectra. A scan speed of 80 spectra/sec with user adjustable integration time is provided. This is achieved using the optics of FIG. 1, except that a splitter is not required and only one spectrometer is utilized, corresponding to the 76 element silicon array. Suitable silicon arrays with 512 elements are available from EG&G Reticon, Sunnyvale, Calif. as their SB series solid state line scanners. Each sensor element has a 100:1 aspect ratio, making the array optimized for spectrographic applications. Low dark leakage currents allow long integration times. Since cooling may be opted to reduce the dark current noise level, the low power dissipation facilitates cooling. Integral amplifiers, shift registers and multiplex switches operating to provide sequential readout permit compact, efficient cooperation with the A/D convertor, buffers, control circuitry and parallel port facility as described above.

An on-board battery-operated memory of 1 mbyte allows storage of at least 256 spectra, thereby avoiding the need for a computer umbilical cable.

By utilizing a multiple spectrometer system as described in said U.S. Pat. No. 5,149,959, which is hereby incorporated by reference, adapted to the 512 element detector and a plurality of 64 element detectors, spectral sampling intervals of 400–1050 nm (512 channels), 1050–1300 nm (64 channels), 1400–1800 nm (64 channels) and 2000–2500 nm (64 channels) can be provided, thus affording improved resolution over the aforementioned U.S. Patent, in a fixed optical system. Compatible with a microcomputer parallel port interface, the system provides conversion of measured data into radiance and reflectance in the field. The system is packaged with a sensor head and control unit, and may be utilized with an optional detachable fiber optic light guide, as described above.

While the invention has been described in its preferred embodiments, it is to be understood that the words which have been used are words of description rather than limitation and that changes maybe made within the preview of the appended claims without departing from the true scope and spirit of the invention in its broader aspects.

Embodiments of an invention in which an exclusive property or right is claimed are defined as follows:

1. Portable spectroradiometer apparatus for acquiring infrared, visible and ultraviolet emission data comprising:
   optical means comprising at least one spectrometer for processing at least infrared emissions or ultraviolet to visible light emissions, said emissions being independent of an applied artificial light source during data acquisition, including diffraction means disposed at a predetermined fixed angle with respect to a linear detector array, for spatially dispersing said emissions in accordance with predetermined spectral wavelengths, and having an entrance slit aperture defining a projected image,
   at least one said linear detector array disposed for receiving said projected image in the form of said spatially dispersed emissions and having sensing elements disposed in accordance with a predetermined wavelength resolution, said sensing elements having an aspect ratio substantially corresponding to the aspect ratio of said entrance slit aperture and being selectively photoresponsive in accordance with predetermined emission wavelengths, and for generating electrical signals in accordance with the amplitude of said spatially dispersed emissions,
   circuit means for processing said electrical signals, comprising means for converting the amplitude of said signals in analog form to digital signals, and means for converting said digital signals from a first digital word to a first sequential plurality of digital words, said plurality of digital words comprising a total number of digital bits corresponding to the number of digital bits in said first digital word, and
   means for sequentially applying said plurality of digital words to a parallel port of a digital computer, each digital word being transmitted in parallel binary digit form.

2. Apparatus as set forth in claim 1, wherein said circuit means further comprises means responsive to commands from said parallel port of said digital computer in the form of a further sequential plurality of digital words in parallel digit form, the number of bits in each of said further plurality of digital words being equal to the number of bits in each of said first sequential plurality of digital words.

3. Apparatus as set forth in claim 1, comprising:
   a collecting lens for receiving an unfocused image representative of said ultraviolet to visible emissions or infrared emissions and for focusing said image upon said entrance slit aperture,
   a folding mirror angularly disposed for deflecting the path of said focused image from a first plane corresponding to an optical axis of said collecting lens to a second plane corresponding to an optical axis of said entrance slit aperture,
   a first collimating mirror angularly disposed for collimating said image from said entrance slit aperture to first emission dispersing means, and for deflecting the path of said image from said entrance slit aperture from said optical axis of said entrance slit aperture to a further optical axis directed upon said emission dispersing means, and
   a focusing lens disposed in a path between said first emission dispersing means and a first linear detector array for focusing said image from said first emission dispersing means through a cylindrical focusing lens upon said first linear detector array, said cylindrical focusing lens being located proximate to said first linear detector array and having a major longitudinal axis and a minor transverse axis, with said longitudinal axis oriented parallel to a longitudinal axis of said array and said transverse axis oriented parallel to the optical axis of said entrance slit aperture.

4. Apparatus as set forth in claim 3, further comprising beam splitter means interposed in the optical path between said folding mirror and said first collimating mirror, for angularly diverting a portion of said ultraviolet to visible emissions or infrared emissions in accordance with a predetermined distribution of wavelengths and for applying said diverted portion to a second collimating mirror, said second collimating mirror angularly disposed to deflect said diverted portion in collimated form to second emission dispersing means, said second emission dispersing means angularly disposed for deflecting incident emissions spatially dispersed upon a focusing mirror, said focusing mirror angularly disposed to deflect incident emissions from said second emission dispersing means through a second cylindrical focusing lens and upon a second linear detector array, said second cylindrical focusing lens having a major longitudinal axis and a minor transverse axis, with said longitudinal axis of said second cylindrical focusing lens oriented parallel to a longitudinal axis of said second detector array and said transverse axis of said second cylindrical focusing lens oriented parallel to the optical axis of said entrance slit aperture.

5. Apparatus as set forth in claim 4, wherein said second linear detector array comprises a silicon photodiode array comprised of 512 sensing elements.

6. Apparatus as set forth in claim 5, said first linear detector array, further comprising a plurality of linear detector arrays comprised of lead sulphide.

7. Apparatus as set forth in claim 3, further comprising fiber optic emission collecting means coupled to said entrance slit aperture for receiving ultraviolet to visible emissions and short have infrared emissions.

8. Apparatus as set forth in claim 3, further comprising laser beam finder means, for directing an optical axis of said entrance slit aperture upon a desired emission target, said laser beam finder comprised of a source of laser radiation geometrically coupled to said optical axis of said entrance slit aperture and disposed to provide two parallel and substantially adjacent laser beams, the geometric center between said beams defining the center of the target area.

9. Apparatus as set forth in claim 4, said circuit means further comprising:

preamplifier means coupled to provide parallel analog outputs of ones of said sensor elements of said first and second linear detector arrays, multiplexer means for serially providing preamplified output signals of said sensor elements and responsive to a signal for selecting one of a plurality of multiplexers corresponding to one of a plurality of linear detector arrays, amplifier means coupled to provide amplified analog signals from said multiplexers, switch means for selecting an amplified output from a selected one of said multiplexers, and responsive to a signal for selecting a desired amplified output, analog-to-digital converter means coupled to receive analog signals from said switch means and to convert said analog signals to a series of digital words, wherein ones of said digital words correspond to ones of said sensor elements, said convertor means responsive to a control signal for starting and stopping the conversion process, buffer means for sequentially storing said digital words and providing said digital words in incremental bytes to the parallel port of a computer, said buffer means response to a control signal for selecting and reading out said incremental data bytes, and control means comprising decoder means responsive to command signals from said parallel port of said computer for providing said switch signal, said conversion control signal, said buffer control signal, and a clock signal for timing said select and control signal occurrence, and further comprising counter means coupled to receive said clock signal and to provide a predetermined control signal synchronized with said decoder provided signals for activating said multiplexers alternately and sequentially.

10. Apparatus as set forth in claim 9, said apparatus further comprising:

a photoresponsive detector responsive to infrared emissions, said detector having a characteristic resistance which varies as a function of the intensity of said infrared emissions, and having first and second terminals adapted for providing a signal corresponding to said intensity to said preamplifier means, said preamplifier means comprising an amplifier having a differential input and an output, a first input of said amplifier coupled to one of said terminals of said detector, and a second input of said amplifier coupled to a predetermined voltage source for providing bias to said amplifier, a feedback resistance coupled between said first input and said output of said amplifier, said second terminal of said detector being coupled to electrical ground, so that as said intensity of infrared emissions varies, the gain of said combination varies proportionately, whereby said signal is amplified in accordance with said emissions, and means for coupling said amplified signal to said multiplexer means.

11. A method of transferring data bidirectionally between a spectrometer and a Centronics parallel port, said port providing a plurality of data lines and control and status lines, wherein said transferred data is comprised of a 16-bit data word and said port is adapted for undirectional transmission of 8-bit bytes over its data lines to an external device, and reception of discrete status and control signals from said external device, comprising:

providing digital output data from an output port of said spectrometer in a serial sequence of 4-bit data nibbles, a plurality of said 4-bit data nibbles comprising a 16-bit data word, executing a transfer of said serial sequence over said plurality of status lines to said parallel port, providing digital output data from said parallel port in a further serial sequence of 4-bit data nibbles, a plurality of said further 4-bit data nibbles comprising a 16-bit data word, and executing a transfer of said further serial sequence over said plurality of control lines from said parallel port to an input port of said spectrometer.

* * * * *